Aug. 28, 1956 R. E. DRAKE 2,760,659
POWER UNIT FOR WAGON UNLOADER
Filed Dec. 11, 1953 2 Sheets-Sheet 1

*INVENTOR*
ROBERT E. DRAKE
BY
*Albert S Sperry*
ATTORNEY

Aug. 28, 1956 — R. E. DRAKE — 2,760,659
POWER UNIT FOR WAGON UNLOADER
Filed Dec. 11, 1953 — 2 Sheets-Sheet 2

*INVENTOR*
ROBERT E. DRAKE
BY
Albert Sperry
ATTORNEY

United States Patent Office 2,760,659
Patented Aug. 28, 1956

2,760,659
POWER UNIT FOR WAGON UNLOADER

Robert E. Drake, Levittown, Pa., assignor to Lavelle Aircraft Corporation, Newtown, Pa., a corporation of Pennsylvania Application December 11, 1953, Serial No. 397,684

6 Claims. (Cl. 214—82)

This invention relates to power operated wagon unloading equipment and is directed particularly to constructions adapted for use with substantially any type of wagon without modification thereof.

Many types of wagon unloading equipment have been developed heretofore but such constructions have required the use of rollers or other elements which are permanently mounted on each wagon. Furthermore, the power units employed with such devices have presented serious torque problems due to the forces required to operate the equipment. It has, therefore, been necessary to mount the power unit on the ground or to add further parts to the wagons to support the unit and take up the torque.

In accordance with the present invention a power operated wagon unloader is provided which can be applied to substantially any wagon without any modification of the wagon whatever. Moreover, the torque of the power or drum unit is taken up within the assembly itself whereby the device can be positioned directly on the wagon body without the aid of any special mounting or supporting means.

These advantages are attained by providing an end gate or draw plate which is movable over the bed of the wagon from the front to the rear thereof for pushing the load off the rear of the bed. Power operated means are provided for moving the end gate and include cables which pass through guide means on a bracket arranged to slip over the rear end of the wagon bed. A motor and cable drum are mounted on the bracket in position to cause the pull on the cables to urge the bracket into position on the wagon, the forces being applied along a line between opposite edges of the bracket. Therefore, the torque of the motor is taken up the bracket while the bracket is held in place by the forces applied to the cables by the cable drum.

One of the objects of the present invention is to provide novel wagon unloading equipment adapted to be applied to existing wagons without modification thereof.

Another object of the invention is to provide a drum unit for wagon unloading equipment adapted to support and position a motor and cable actuating drum.

A further object of the invention is to provide a drum unit for use with wagon unloading equipment and including a bracket, a cable drum mounted on the bracket and cable guiding means positioned to cause the forces applied to cables by said drum to urge the bracket into place on a wagon bed.

These and other objects and features of the present invention will appear from the following description thereof in which reference is made to the figures of the drawing.

Figure 1:
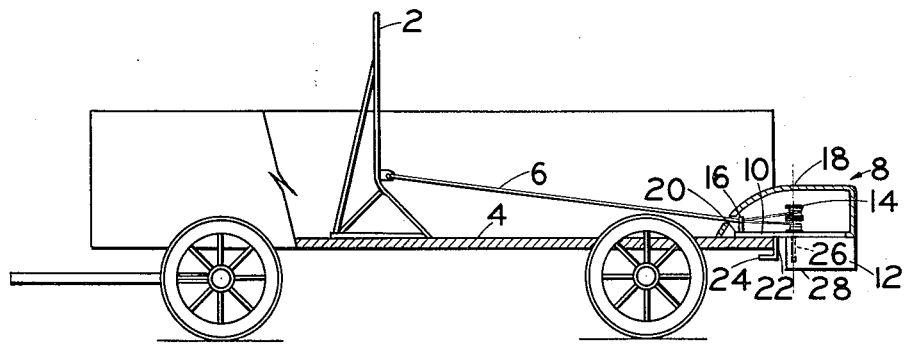
Fig. 1 is a side view showing a wagon unloader embodying the present invention mounted on a wagon, one side of the wagon being broken away for clarity.
Figure 2:
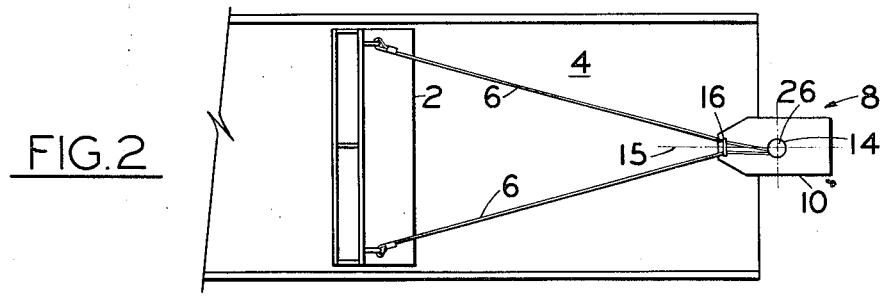
Fig. 2 is a plan view of the construction of Fig. 1.
Figure 3:
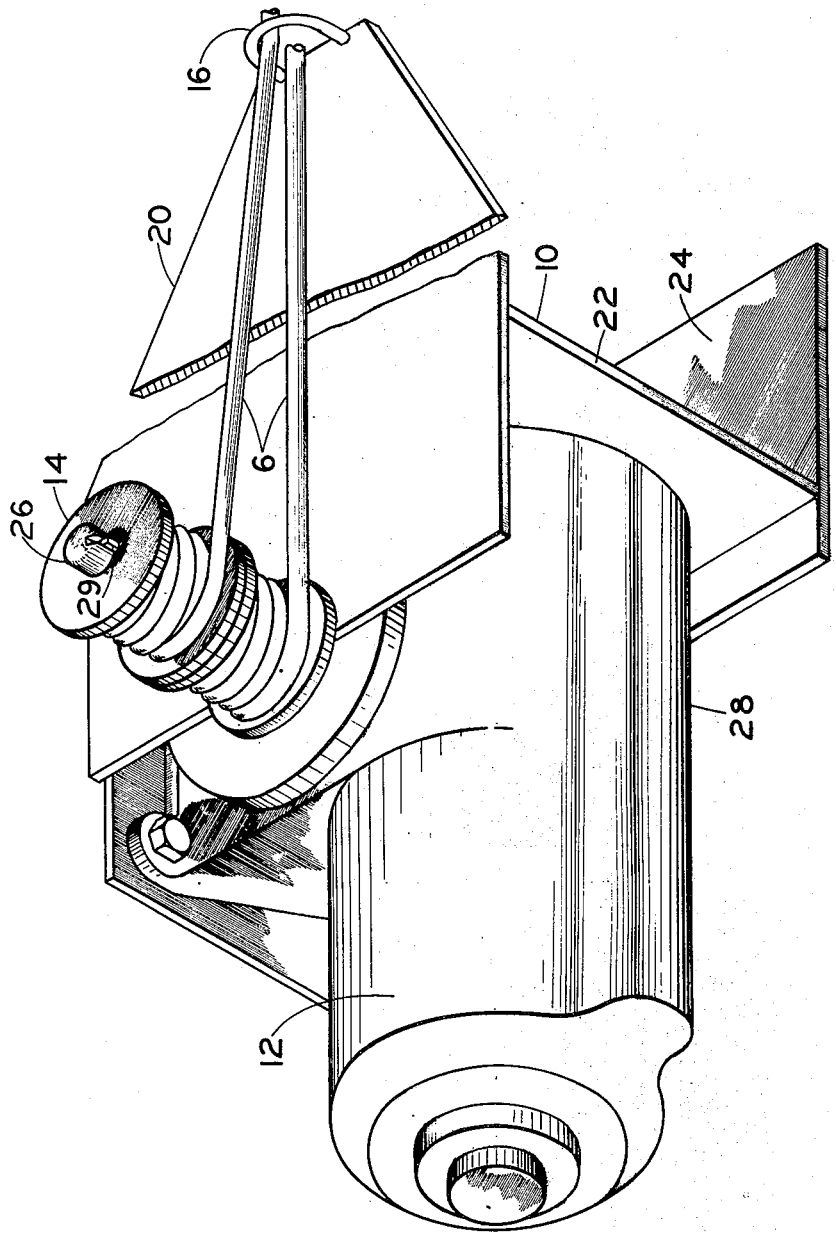
Fig. 3 is a perspective illustrating the drum unit of Fig. 1 with the cover thereof removed.

In that form of the invention chosen for purposes of illustration in Figs. 1, 2 and 3, the equipment includes an end gate 2 which is designed to be pulled over the bed 4 of a wagon from the front toward the rear of the bed by cables 6 actuated by the power or drum unit 8. The unit 8 includes a bracket 10 which is engageable with the rear end of the wagon bed and is provided with a motor 12 which serves to drive a cable drum 14. Guide means 16 are mounted near the forward end of bracket 10 and are positioned with respect to the drum 14 so that the forces applied to the cables are directed in a line 15 passing between the opposite edges of the bracket. The bracket is, therefore, urged against and positioned on the end of the wagon body by the action of the unloading equipment in pulling the end gate and load toward the rear of the body for discharge of the load. The unit 8 may be provided with a hood or cover 18 for protecting the elements thereof from the load being discharged over and about the unit.

The form of bracket 10 which is illustrated in the drawings includes a top plate 20 which extends forward over the upper surface of the bed, a positioning plate 22 which extends at right angles to the top plate 20 in position to bear against the rear end of the wagon bed, and a retaining member 24 which projects forward from the lower edge of the positioning plate beneath the wagon bed. The bracket is thus generally C-shaped in vertical cross section and may have the motor 12 mounted thereon at the rear, bottom or side as desired. The cable drum 14 preferably projects upward above the top plate 20 and is rotatable by means of the vertical shaft 26. The drum 14 and shaft 26 are driven by the motor 12 through suitable reduction gearing indicated at 28.

In using the construction illustrated an end gate 2 is placed on upright position near the forward end of an empty wagon bed 4 and the cables 6 are attached to the end gate 2 near the lower portion thereof. The cables are laid on the bed of the wagon and secured near the rear end of the bed. The wagon may then be loaded and drawn to the place where it is to be unloaded. On arrival at the discharge point, the drum unit 8 is mounted on the wagon by sliding bracket 10 over the rear end of the wagon bed, as seen in Figs. 1 and 2. Cables 6 are then slipped through the guide means 16 and attached to drum 14 in any suitable manner. Motor 12 is then started to rotate drum 14 through reduction gears 28 and shaft 26 whereupon the cables 6 are wound on drum 14. The tension applied to the cables 6 serves to draw drum unit 8 firmly against the rear end of the wagon bed and, thereafter, end gate 2 is drawn rearward pushing the load off the rear end of the bed. A cover or shield 18 may be provided to prevent portions of the load from fouling the motor. When the load has been discharged the motor is stopped, the cables 6 are released from the drum 14 and the unit is then available for application to another wagon to discharge the load therefrom.

The releasing of the cables from the drum 14 can be effected in various ways as by providing a clutch (not shown) for releasing the shaft or drum from the motor or by forming the key 29 which connects the drum 14 to shaft 26 so that it is sufficiently loose to permit the drum to be removed from the shaft to unwind the cables 6 therefrom.

Drum unit 8 is shown in Fig. 2 as being located centrally between the opposite sides of the wagon at the rear end of the wagon bed 4. This is not actually necessary, however, since the drum unit will operate satisfactorily from any position on the rear end of the bed. Furthermore, the power unit need not be squarely seated before starting it in operation since the initial tension on cables 6 will draw the drum unit against the rear end of the wagon and cause it to seat itself properly before it begins to draw the end gate rearward.

If desired, retaining member 24 of the bracket which extends forward beneath the wagon bed may be provided with adjustable clamping means, such as thumb screws, or the like. However, this also is unnecessary provided the guide means 16 is closed at the top and the points of attachment of cables 6 to the end gate 2 are above the top of the guide means. When the elements are arranged in this manner as shown in Fig. 1 the tension applied to the cables 6 and drum 14 which tend to tilt the drum unit 8 forward are overcome by the lifting effect of the cables 6 tending to raise the guide means 16 and the front end of top plate 20. The forces applied to the power unit and bracket are thereby balanced so that the bracket is urged forceably against the rear end of the bed 4 preventing the drum unit 8 from being displaced. This will be true even where the end of the bed is considerably thinner than the distance between plate 20 and member 24.

Figure 4:
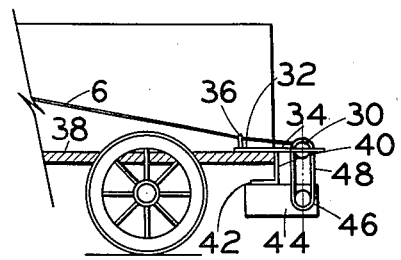
Fig. 4 is a partial side view of a wagon employing a modified form of the invention.
Figure 5:
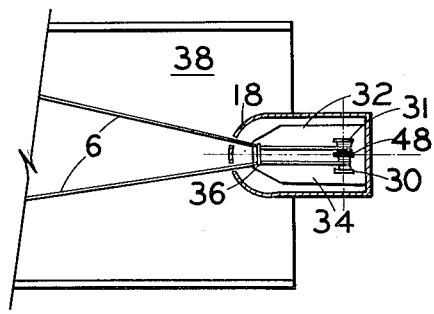
Fig. 5 is a plan view of the construction of Fig. 4.

Figs. 4 and 5 illustrate a modification of the invention wherein the drum 30 is located horizontally in an opening 31 formed in top plate 32 of the bracket 34. The bracket carries guide means 36 at its forward end and is held in position on the wagon bed 38 by positioning plate 40 and retaining member 42. In this form of the invention, motor 44 is shown as being attached to the underside of retaining member 42 and drives drum 30 through reduction gearing 46 and chain 48. The end gate and cables are the same as those shown in Figs. 1 and 2 and the operation of this form of the device is identical with that of the construction shown in Figs. 1 and 2.

As stated above, the position of the motor is a matter of choice. It can be placed as shown in either Fig. 1 or Fig. 5 or could be mounted vertically. Also, in Fig. 4 a shaft drive could be substituted for the chain. If desired, the shaft which rotates the cable drum can be provided with a square or other shaped end portion and the drum can be designed to be removably attached to the shaft. Numerous other changes and modifications can be made and it should, therefore, be clearly understood that those forms of the invention described above and shown in the figures of the accompanying drawings are intended to be illustrative only and are not intended to limit the scope of the invention.

What I claim is:

1. An unloading device for a farm vehicle comprising an end gate movable along the body of said vehicle, cables connected to said end gate, and a portable drum unit separable from said vehicle comprising a mounting bracket having positioning means thereon engageable with the end of the vehicle body, cable guide means mounted on said bracket forwardly of said positioning means and between the opposite edges thereof, a cable drum mounted on said bracket and attachable to said cables, and means for rotating said drum to draw said end gate along said vehicle body to discharge a load therefrom.

2. An unloading device for a farm vehicle comprising an end gate movable along the body of said vehicle, cables connected to said end gate, and a portable drum unit separate from said vehicle comprising a generally C-shaped mounting bracket formed with a top plate, a positioning plate and a retaining member, said positioning plate being at right angles to both said top plate and said retaining member and extending therebetween, a cable drum attachable to said cables extending above said top plate, guide means for said cables mounted on said top plate and positioned between the opposite edges of said positioning plate so that tension applied to said drum by said cables will be exerted along a line passing between said edges to urge the positioning plate toward the end of the wagon bed, and a motor mounted on said bracket and operable to rotate said drum to wind said cable on the drum and drawing said end gate rearward of said vehicle body to discharge a load therefrom.

3. A portable power unit for farm vehicle unloading mechanism comprising a generally C-shaped bracket having a top plate, a positioning plate perpendicular to said top plate for engaging the rear end of the bed of a vehicle to position the unit thereon, a cable drum rotatably supported adjacent the rear end of said top plate, cable guide means mounted on said top plate adjacent the forward end thereof, said guide means being closed at the top to prevent the cables from escaping therefrom and a motor mounted on said bracket for rotating said cable drum.

4. Unloading mechanism for farm vehicles comprising an end gate movable along the body of said vehicle, cables attached to said end gate, and a portable drum unit separate from said vehicle and comprising a generally C-shaped bracket having a top plate formed with an opening therein adjacent the rear end thereof, a positioning plate extending perpendicularly with respect to said top plate, a cable drum mounted horizontally for rotation in said opening in said top plate, cable guide means mounted on said top plate near the forward end thereof, a motor mounted on said bracket, reduction gear means driven by said motor and chain drive means connecting said drum to be driven by said motor through said reduction gear means.

5. Unloading mechanism for a farm vehicle comprising an end gate movable along the body of said vehicle, cables attached to said end gate, and a portable drum unit separate from said vehicle comprising a generally C-shaped bracket having a top plate, a retaining member, and a positioning plate extending perpendicularly between said top plate and said retaining member, a cable drum mounted for rotation adjacent the rear end of said top plate, cable guide means mounted on said top plate adjacent the front end thereof, said guide means being closed at the top so that upward movement of the cables within the guide means will tend to raise the front end of said top plate and oppose tilting of the bracket under tension applied thereto by the cables, and power actuated means for supplying power to rotate said drum and thereby draw said end gate rearward to discharge a load from said vehicle.

6. A portable unloading device removably attachable to a farm vehicle comprising an end gate movable along the body of said vehicle, cables connected to said end gate, a portable drum unit separable from said vehicle and having a cable drum attachable to said cable for drawing said end gate along said vehicle body to discharge a load therefrom, a bracket on said unit slidable into and out of engagement with the end of the vehicle body and having positioning means thereon for holding the unit in place with respect to the vehicle body during operation of said device, and a motor separate from said vehicle connected to drive said drum.

References Cited in the file of this patent

UNITED STATES PATENTS

| 1,614,797 | Marsh et al. | Jan. 18, 1927 |
| 2,495,358 | Wengert | Jan. 24, 1950 |
| 2,498,286 | Mahnke | Feb. 21, 1950 |
| 2,512,339 | Knapp | June 20, 1950 |
| 2,595,395 | Lavelle et al. | May 6, 1952 |
| 2,627,761 | Recker | Feb. 10, 1953 |